US007813475B1

(12) United States Patent
Wu et al.

(10) Patent No.: US 7,813,475 B1
(45) Date of Patent: Oct. 12, 2010

(54) X-RAY MICROSCOPE WITH SWITCHABLE X-RAY SOURCE

(75) Inventors: Ziyu Wu, Beijing (CN); Wenbing Yun, Walnut Creek, CA (US); Peiping Zhu, Beijing (CN); Yuxin Wang, Northbrook, IL (US); Qingxi Yuan, Beijing (CN); Andrei Tkachuk, Walnut Creek, CA (US); Wanxia Huang, Beijing (CN); Michael Feser, Walnut Creek, CA (US)

(73) Assignee: Xradia, Inc., Concord, CA (US)

( * ) Notice: Subject to any disclaimer, the term of this patent is extended or adjusted under 35 U.S.C. 154(b) by 0 days.

(21) Appl. No.: 12/401,740

(22) Filed: Mar. 11, 2009

Related U.S. Application Data

(60) Provisional application No. 61/035,479, filed on Mar. 11, 2008, provisional application No. 61/035,481, filed on Mar. 11, 2008.

(51) Int. Cl.
*G01N 23/04* (2006.01)

(52) U.S. Cl. .......................................................... 378/62

(58) Field of Classification Search .................. 378/43, 378/84, 85, 70, 79, 145, 156, 119, 62
See application file for complete search history.

(56) References Cited

U.S. PATENT DOCUMENTS 5,590,168 A * 12/1996 Iketaki ........................ 378/43
6,526,121 B1 * 2/2003 Hwu et al. .................... 378/62

* cited by examiner

*Primary Examiner*—Irakli Kiknadze
(74) *Attorney, Agent, or Firm*—Houston Eliseeva, LLP

(57) ABSTRACT

An x-ray imaging system uses a synchrotron radiation beam to acquire x-ray images and at least one integrated x-ray source. The system has an imaging system including sample stage controlled by linear translation stages, objective x-ray lens, and x-ray sensitive detector system, placed on a fixed optical table and a mechanical translation stage system to switch x-ray sources when synchrotron radiation beam is not available.

17 Claims, 1 Drawing Sheet

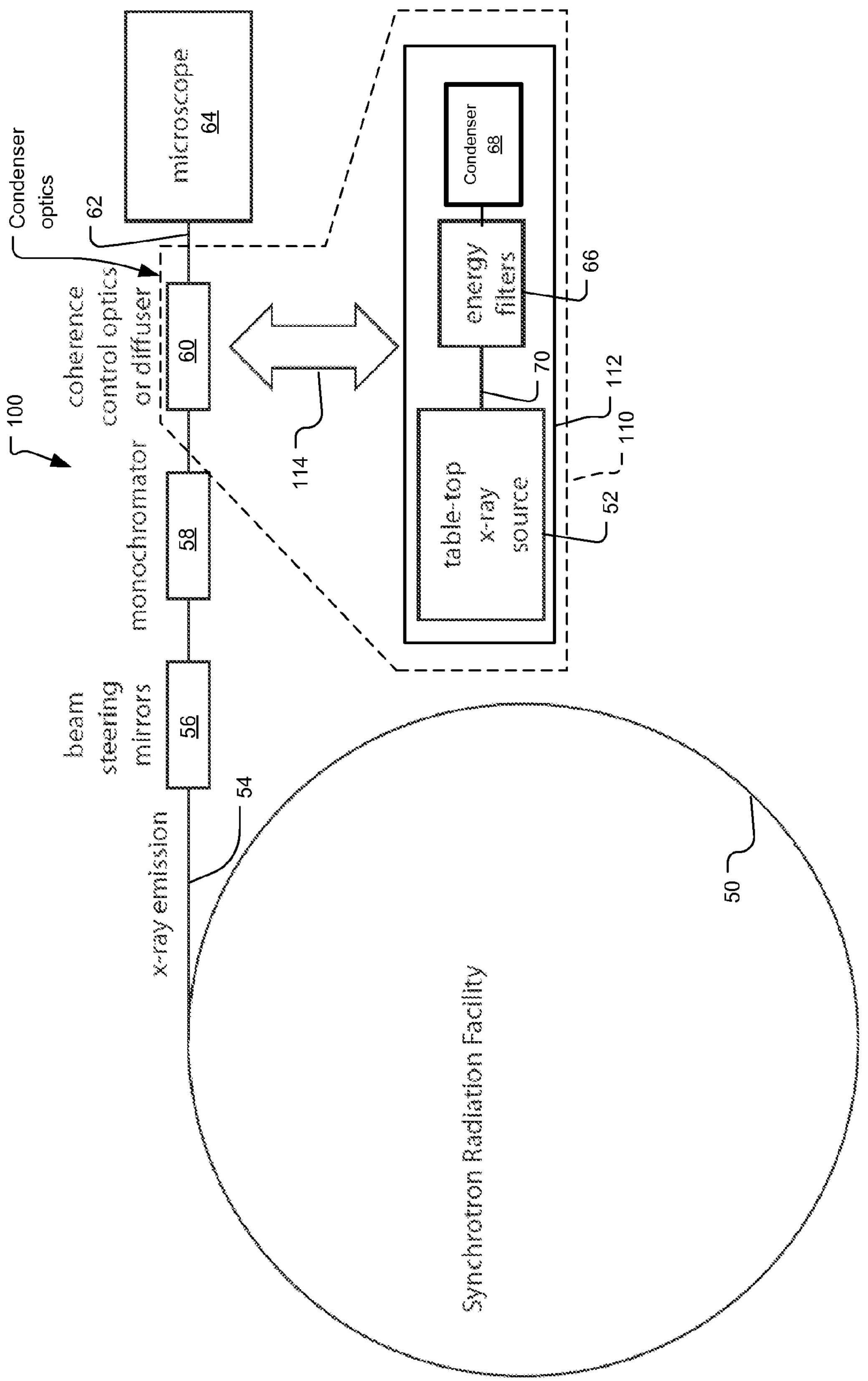
microscope
64
Condenser optics
62
coherence control optics or diffuser
60
100
monochromator
58
beam steering mirrors
56
x-ray emission
54
Synchrotron Radiation Facility
50
114
Condenser
68
energy filters
66
70
112
110
table-top x-ray source
52

X-RAY MICROSCOPE WITH SWITCHABLE X-RAY SOURCE

RELATED APPLICATIONS

This application claims the benefit under 35 USC 119(e) of U.S. Provisional Application Nos. 61/035,479, filed on Mar. 11, 2008 and 61/035,481, filed on Mar. 11, 2008, both of which are incorporated herein by reference in their entirety.

This application relates to U.S. application Ser. No. 12/401,750 filed on Mar. 11, 2009.

BACKGROUND OF THE INVENTION

X-ray imaging has become an important part of our lives since its invention in the 19th century. The imaging techniques that are used in medical imaging and security inspection systems are usually projection systems that record the shadow radiograph behind the subject. In the 1980s, microscopy techniques based on x-ray lenses have emerged to dramatically improve the resolution of x-ray imaging to tens of nanometers.

The majority of these x-ray imaging systems use traditional table top electron-bombardment x-ray sources, but sources with much higher brightness and different spectral characteristics have also been used to expand the capabilities of x-ray imaging techniques. In particular, synchrotron radiation sources provide highly collimated beams with 6 to 9 orders of magnitude higher brightness and tunable narrow bandwidth. In additional to dramatically improving the microscopy throughput, the synchrotron sources also enable spectral microscopy techniques that are able to selectively image specific elements in a sample. These developments have resulted in powerful microscopy techniques with unique capabilities that are not found with other technologies.

On drawback of synchrotron radiation facilities is the relatively long down-time compared with tabletop x-ray sources. While a tabletop source can typically run continuously between annual or semi-annual maintenance intervals, synchrotrons typically require more frequent maintenance intervals with long shutdown times. These maintenance requirements lead to excessive down-time of x-ray imaging instruments.

SUMMARY OF THE INVENTION

A solution for integrating a tabletop x-ray source to the x-ray microscope imaging system so that it can be used to power the instrument when the synchrotron x-ray beam is not available is described. A typical setting is where imaging system will be stationed at a synchrotron radiation facility and normally performs the imaging operations using the high brightness synchrotron radiation. However, when the synchrotron is not in operation, e.g., during maintenance periods, the imaging system will operate with an alternative self-contained x-ray source such as a table-top x-ray source.

Because different x-ray sources offer different emission characteristics such as spatial coherence and spectrum, some beam conditioning systems must be used. They include different types of optical elements to control the beam collimation and energy filters.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings:

FIG. 1 is a schematic diagram of a synchrotron-based x-ray microscope that includes an integrated table-top x-ray source along with its energy filtering system with a mechanical translation system that switches between the two x-ray sources.

DETAILED DESCRIPTION OF THE PREFERRED EMBODIMENTS

FIG. 1 shows x-ray microscope system 100 using a table-top source 52 and synchrotron source 50 according to the principals of the present invention.

Synchrotrons generate highly collimated x-ray radiation with tunable energy. They are excellent sources for high-resolution x-ray microscopes. The x-ray radiation 54 generated from the synchrotron 50 is controlled and aligned by the beam-steering mirrors 56. It then reaches a monochromator 58 to select a narrow wavelength band. The monochromator 58 is typically gratings or a crystal monochromator to disperse the x-ray beam 54 based on wavelength. When combined with entrance and exit slits, it will select a specific energy from the dispersed beam. The energy resolution will depend on the grating period, distance between the slits and grating, and the slit sizes.

Also included is the table-top x-ray source 52. Typically this source is a rotating anode, microfocus, or x-ray tube source.

Either of the table-top x-ray source 52 and the synchrotron 50 provides a radiation beam 62 to an x-ray imaging system 64. For high resolution applications, the imaging system 64 is a microscope, which includes sample holder, for holding the sample, an objective lens for forming an image of the sample and a detector for detecting the image formed by the objective lens. In one example, a zone plate lens is used as the objective lens. A compound refractive lens is used on other examples. In the preferred implementation, the imaging system 64 is full-field imaging x-ray microscope, but in other examples a scanning x-ray microscope is used.

The monochromator 58 is usually used to produce a monochromatic beam in order to satisfy energy bandwidth requirement of the imaging system 64. For example, commonly used objective lenses in x-ray microscopy are Fresnel zone plate lenses. They provide very high resolution of up to 50 nanometers (nm) with higher energy x-rays above 1 keV and 25 nm for lower energy x-rays. Since these lenses are highly chromatic, using a wider spectrum will lead to chromatic aberration in the image. Zone plates typically require a monochromaticity on the order of number of zones in the zone plate lens. This is typically 200 to several thousand, thus leading to a bandwidth of 0.5% to 0.05%. This energy selection process of the monochromator 58 typically makes use of a small portion of the x-ray radiation generated by the source and rejects the rest of the spectrum from the synchrotron 50.

In contrast, emissions from a table-top x-ray sources typically contain a sharp characteristic emission line superimposed on a broad Bremsstrahlung background radiation. The characteristic emission line typically contains a large portion the total emission, typically 50-80%, within a bandwidth of 1/100 to 1/500. In order to create a monochromatic radiation, an absorptive energy filter system 66 is used to remove unwanted radiation from the table-top x-ray source 52 and only allow a particular passband. Two filters are often used: one to absorb primarily low energy radiation below the characteristic line and one to absorb energies above the emission line. This filtering system provides a very simple way to condition the beam but at a cost of some absorption loss of radiation.

Alternatively, a monochromator system can also be used in the filter system 66. This typically contains a grating or multilayer to disperse the x-ray radiation and an exit slit to block unwanted radiation.

The source switching system requires monochromatization devices for both synchrotron radiation source 50 and table-top x-ray source 52. In most applications, the synchrotron beam monochromator 58 is built into the beamline and the monochromator/filters 66 for the table-top source 52 are integrated into the x-ray source 52 or the switching system 110.

Synchrotron radiation typically has much higher spatial coherence, i.e. too highly collimated, than is suitable for a full-field imaging microscope and must be reconditioned using beam conditioning optics 60 that modify the x-ray characteristics to meet the requirements of the x-ray imaging system 64. Typical methods to reduce the coherence use a diffusing element such as polymers arranged in random directions or a rotating element. This approach is very simple to implement but has the disadvantage of loosing significant amount of radiation intensity.

Alternatively, the conditioning optics 60 use a set of two mirrors that first deflect the beam off axis and then reflect the deflected beam toward to focal point on axis. This set of mirrors is allowed to rotate rapidly about the optical axis to create a cone shaped beam illumination pattern that will provide increased divergence.

In some examples, the beam conditioning optics 60 include diffractive element(s) such as a grating and Fresnel zone plate lenses or reflective elements such as ellipsoidal lenses or Wolter mirrors. Compound refractive lenses can also be used.

Another method to increase the beam divergence is to use a capillary lens as the conditioning optics 60 to focus the beam towards the focal point. This method provides a simple means of modifying the collimation of the beam. The capillary lens can be scanned rapidly in a random pattern. Finally, a grating upstream of the capillary lens can be used to further increase the beam divergence.

The beam coherence of the beam 70 of laboratory source 52 is very different from that of synchrotron 50. Table-top sources behave like point sources so that radiation emitted is roughly omni-directional. With these types of sources a simple capillary lens is preferably used as a condenser 68 to project the source's radiation towards the sample. The capillary lens is generally designed in an ellipsoidal shape with the x-ray source and sample at the foci.

The switch system 110 contains the condenser optics 68 for the table top source 52 and the conditioning optics 60 for the synchrotron 50. Both optics are contained in the switching system and switched along with the x-ray sources. The switching system 110 includes a mechanical positioning system that is integrated to ensure reliable repositioning of each optics after each switching action. This switching system 110 is based on a combination of kinematic mounting systems, mechanical stages, electromechanical motors, optical encoders, capacitance position measurements, etc.

The system 110 switches between the synchrotron source 50 and table-top x-ray source 52 with a mechanical translation system that replaces the conditioning optics 60 with the table-top source 52, energy filters 66 and condenser 68 in beam axis to the imaging system 64. The table-top x-ray source 52 and its energy filters 66 and condenser optics 68 are integrated in a single assembly 112 and mounted on a motorized translation stage of the system 110 with optical encoders. The conditioning optics 60 for the synchrotron beam is mounted at opposite end of the mechanical translation stage. Therefore, the switching action can be made by a simple translational action, see arrow 114.

In some systems with a vacuum connection, the conditioning optics 60 for the synchrotron beam will also contain provisions for the optics and possibly the microscope to operate in vacuum.

While this invention has been particularly shown and described with references to preferred embodiments thereof, it will be understood by those skilled in the art that various changes in form and details may be made therein without departing from the scope of the invention encompassed by the appended claims.

What is claimed is:

1. An x-ray imaging system, comprising:

a synchrotron for generating a synchrotron radiation beam;

an integrated x-ray source for generating a source radiation beam; and an imaging system that alternately receives the source radiation beam of the integrated x-ray source and the synchrotron radiation beam of the synchrotron, and includes a sample stage controlled by linear translation stages, an objective lens, and an x-ray sensitive detector system on a fixed optical table, wherein the objective lens forms an image of a sample, held on the sample stage, on the detector system using the source radiation beam or the synchrotron radiation beam.

2. An x-ray imaging system as claimed in claim 1, wherein the integrated x-ray source is a electron bombardment source including a rotating anode, a microfocus, or an x-ray tube source.

3. An x-ray imaging system as claimed in claim 1, wherein the x-ray imaging system includes a zone plate lens as an objective lens.

4. An x-ray imaging system as claimed in claim 1, wherein the x-ray imaging system includes a compound refractive lens as the objective lens.

5. An x-ray imaging system as claimed in claim 1, further comprising beam conditioning optics for modifying x-ray emission characteristics of the synchrotron radiation beam to meet requirements of the x-ray imaging system.

6. An x-ray imaging system as claimed in claim 5, wherein the beam conditioning optics include a diffractive element including a grating or Fresnel zone plate lens.

7. An x-ray imaging system as claimed in claim 5, wherein the beam conditioning optics include a reflective element including an ellipsoidal lens or a Wolter mirror.

8. An x-ray imaging system as claimed in claim 5, wherein the beam conditioning optics include a compound refractive lens.

9. An x-ray imaging system as claimed in claim 5, wherein the beam conditioning optics include a rotating mirror assembly rotating about the beam axis.

10. An x-ray imaging system as claimed in claim 5, wherein the beam conditioning optics include a capillary lens.

11. An x-ray imaging system as claimed in claim 5, further comprising an optical assembly comprising the integrated source, an energy filter for filtering the source radiation beam, and a condenser for focusing the source radiation beam that is received by the imaging system.

12. An x-ray imaging system as claimed in claim 11, wherein the optical assembly replaces the beam conditioning optics in an optical path when the imaging system is configured to receive the source radiation beam.

13. An x-ray imaging system as claimed in claim 1, wherein the imaging system includes a full-field imaging x-ray microscope.

14. An x-ray imaging system as claimed in claim 1, wherein the imaging system includes a scanning x-ray microscope.

15. An x-ray imaging system as claimed in claim 1, further including a grating-based wavelength energy filter for filtering only the source radiation beam.

16. An x-ray imaging system as claimed in claim 1, further including one or more absorptive energy filters for filtering only the source radiation beam.

17. An x-ray imaging system as claimed in claim 1, further comprising an optical assembly comprising the integrated source, an energy filter for filtering the source radiation beam, and a condenser for focusing the source radiation beam that is received by the image system.

* * * * *